US012681889B1

(12) United States Patent (10) Patent No.: US 12,681,889 B1
Azimi (45) Date of Patent: Jul. 14, 2026

(54) MULTIPURPOSE PROCESSOR CARD

(71) Applicant: United States of America as represented by the Administrator of NASA, Washington, DC (US)

(72) Inventor: Behnam Azimi, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 119 days.

(21) Appl. No.: 18/896,497

(22) Filed: Sep. 25, 2024

(51) Int. Cl.
*G06F 13/42* (2006.01)
*G06F 1/26* (2006.01)

(52) U.S. Cl.
CPC ............ *G06F 13/4226* (2013.01); *G06F 1/26* (2013.01)

(58) Field of Classification Search
CPC ............................... G06F 13/4226; G06F 1/26
USPC ........................................................ 710/105
See application file for complete search history.

(56) References Cited

U.S. PATENT DOCUMENTS 9,589,598 B1 * 3/2017 Gilley ..................... G11C 5/005
10,503,584 B1 * 12/2019 Merl .................... G06F 11/1008

| | | | | |
|---|---|---|---|---|
| 11,109,485 | B1 * | 8/2021 | Petrick | H05K 1/181 |
| 11,586,497 | B1 * | 2/2023 | Geist | B64G 1/223 |
| 12,321,309 | B1 * | 6/2025 | Zarev | G06F 9/44505 |
| 2011/0078498 | A1 * | 3/2011 | Flatley | G06F 11/1629 714/15 |
| 2012/0065813 | A1 * | 3/2012 | Nguyen | H04B 7/18519 701/2 |
| 2018/0285192 | A1 * | 10/2018 | Merl | G06F 11/0736 |
| 2019/0028377 | A1 * | 1/2019 | Yamazaki | H04L 43/50 |
| 2019/0163408 | A1 * | 5/2019 | Berger | G06F 12/0246 |

* cited by examiner

*Primary Examiner* — Christopher B Shin
(74) *Attorney, Agent, or Firm* — Derek J. Langdon; Matthew F. Johnston; Trenton J. Roche

(57) ABSTRACT

The present invention is a multipurpose microprocessor card for use as the central processing unit for the Command and Data Handling of spacecraft (C&DH), instrument and payload (IC&DH), as well as any custom instrument controller. The processor card utilizes a state-of-the-art, radiation hardened processor (e.g., Aeroflex Gaisler GR70 Quad-Core LEON4 SPARC V8 250 Mhz processor) and supports SpaceWire, technical standard balanced voltage digital interface circuit (e.g., RS-422), and MIL-1553B protocols to communicate with other critical cards and instruments throughout the spacecraft bus. The present invention takes advantage of the fast communication between the processor and a space-qualified radiation-hardened field-programmable gate array (FPGA), to involve high-speed peripherals controlled by the FPGA and accessible by the processor. The present invention has a dedicated port to provide its analog telemetry to be monitored by other cards and can generate a power cycle by a communication board or any other entity capable of monitoring same.

19 Claims, 1 Drawing Sheet

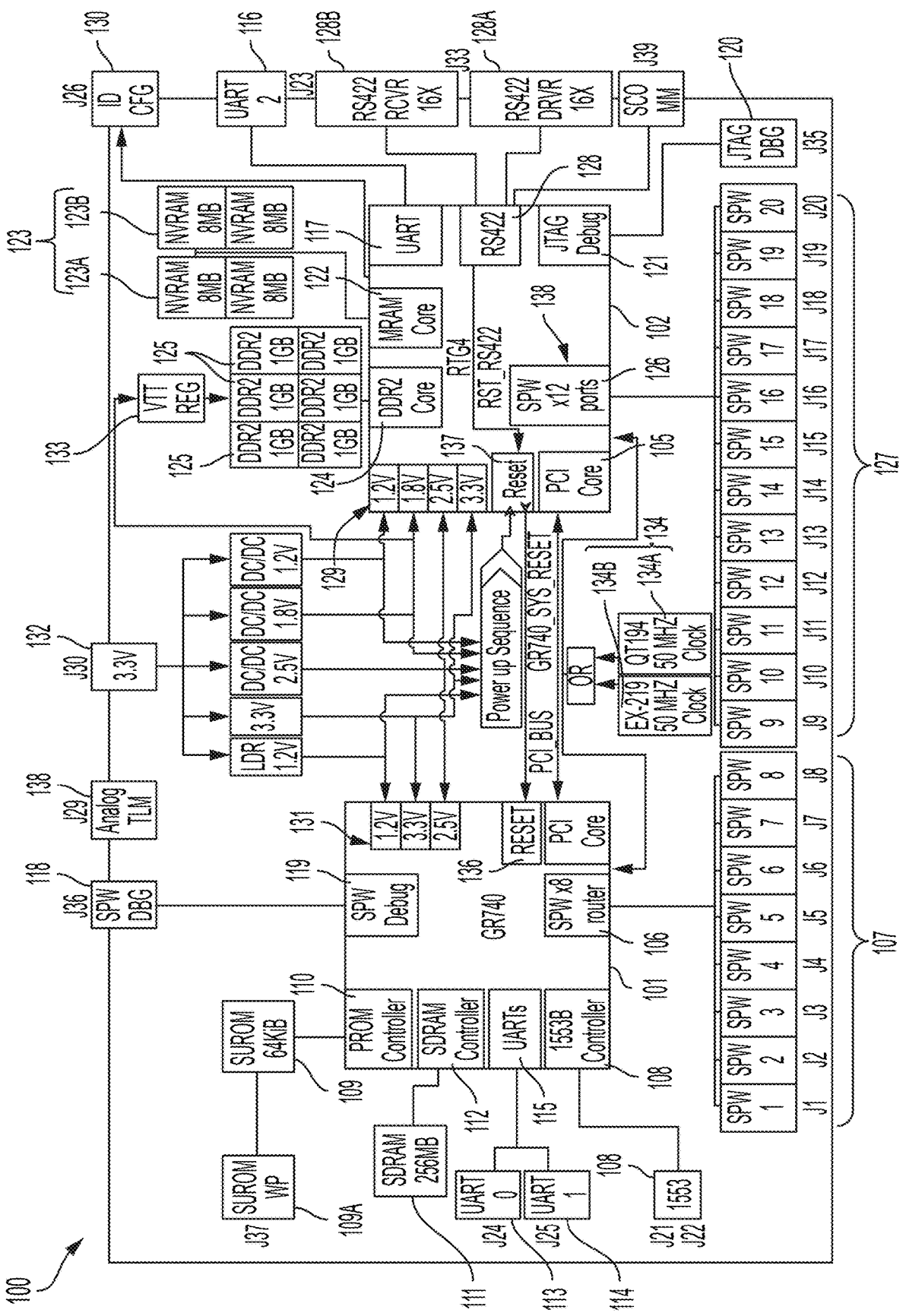

MULTIPURPOSE PROCESSOR CARD

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a multipurpose micro-processor card (MPC) designed for use as a central process-ing unit (CPU) for Command and Data Handling of space-craft (C&DH), instrument, and payload, as well as Coronagraph instrument (CFI), in space telescope applica-tions.

2. Description of the Related Art

The prior art microprocessor cards suffer from the main disadvantages of slow processor speed, slow connection between the processor and field programmable gate array (FPGA), and the lack of the necessary peripherals to support a multitude of different tasks that would be required for space telescope applications.

Thus, a new strategy which can correct for the above disadvantages, is needed.

SUMMARY OF THE INVENTION

The present invention is a multipurpose microprocessor card designed to be used as the central processing unit for the Command and Data Handling of spacecraft (C&DH), instrument and payload (IC&DH), as well as any custom instrument controller. The processor card of the present invention also utilizes a state-of-the-art, radiation hardened processor (e.g., Aeroflex Gaisler GR70 Quad-Core LEON4 SPARC V8 250 Mhz processor) and supports SpaceWire, technical standard balanced voltage digital interface circuit (e.g., RS-422), and MIL-1553B protocols to communicate with other critical cards and instruments throughout the spacecraft bus. The design of the present invention takes advantage of the fast communication between the processor and a space-qualified radiation-hardened field-program-mable gate array (FPGA), to involve high-speed peripherals controlled by the FPGA and accessible by the processor. The present invention has a dedicated port to provide its analog telemetry to be monitored by other cards and is capable of generating a power cycle by a communication board or any other entity capable of monitoring same.

In one embodiment, the processor board includes: a processor; and a field-programmable gate array (FPGA); wherein the processor is connected to the FPGA through a peripheral component interconnect (PCI) interface, which connects a first PCI core on the processor to a second PCI core on the FPGA; wherein the processor is a radiation-hard system-on-chip featuring a quad-core fault-tolerant proces-sor, and which supports a first multi-port SpaceWire router and a plurality of first SpaceWires; wherein the FPGA has a radiation-hard configuration and includes nonvolatile re-programmable flash technology, and single-event upset (SEU) hardened registers; and wherein the FPGA supports a second multi-port SpaceWire router and a plurality of sec-ond SpaceWires that exceeds a number of the plurality of the first SpaceWires.

In one embodiment, the processor board further includes: a plurality of low voltage differential signaling (LVDS) repeaters configured for the plurality of second SpaceWires, with each of the plurality of LVDS repeaters supporting two Space Wire ports.

In one embodiment, the second multi-port SpaceWire router and the plurality of LVDS repeaters support twelve SpaceWire ports, and the first multi-port SpaceWire router supports eight SpaceWire ports, totaling 20 ports supported by the first multi-port SpaceWire router and the second multi-port SpaceWire router.

In one embodiment, the processor supports a start-up non-volatile, read-only memory (SUROM) controlled by a programmable read-only memory (PROM) controller.

In one embodiment, the processor supports a Synchro-nous Dynamic Random Access Memory (SDRAM), con-trolled by an SDRAM controller.

In one embodiment, the processor further includes: a plurality of first universal asynchronous receiver/transmit-ters (UARTs) connected to the processor at a first UART position thereon; and a plurality of second UARTs con-nected to the processor at a second UART position thereon.

In one embodiment, the processor further includes: a plurality of debug ports which allow communication between a target device and a host for debugging purposes.

In one embodiment, the processor board further includes: a SpaceWire debug port connected to the processor; and a joint test action group (JTAG) debug port connected to the FPGA; wherein initial loading of the SUROM is performed through one of the SpaceWire debug port or the JTAG debug port.

In one embodiment, the FPGA further includes: a mag-neto-resistive random-access memory (MRAM), which includes a plurality of non-volatile random-access memories (NVRAM) which serve as a primary program code storage; wherein the MRAM is accessed by the processor through the FPGA.

In one embodiment, the FPGA further includes: a syn-chronous dynamic random-access memory (SDRAM); wherein the SDRAM includes a plurality of double data rate 2 (DDR2) SDRAM banks each of which has a 16-bit interface and is selected with a predetermined chip select signal, an upper data mask (UDQM) and a lower data mask (LDQM).

In one embodiment, the FPGA controls the plurality of DDR2 SDRAM banks and an electrical interface to the plurality of DDR2 SDRAM banks.

In one embodiment, the FPGA further includes: a tech-nical standard balanced voltage digital interface circuit with up to 16 transmitters (TX) and up to 16 receivers (RX), and/or a plurality of low-voltage differential signaling (LVDS) Discrete Differential inputs/outputs (I.O) for use by the FPGA.

In one embodiment, the processor board includes a 3.3V supply voltage.

In one embodiment, the processor board further includes: a plurality of synchronous buck regulators to generate secondary supply voltages for the FPGA and of the proces-sor.

In one embodiment, the processor board further includes: an output termination voltage regulator to regulate power through a plurality of DDR2 SDRAM transmission lines and achieve power conservation by increasing/decreasing current so that an output termination voltage is half of the supply voltage.

In one embodiment, the processor board further includes: a radiation tolerant oscillator which operates based off a single, on-board 50 MHz oscillator; wherein the oscillator sources the processor and the FPGA; and wherein Space-Wire clocks are generated by the processor and the FPGA, separately and internally.

In one embodiment, the FPGA is responsible for generating the data bus, the PCI interface, and an external memory clock for the processor.

In one embodiment, the power-up sequencing after power-on is automatic to reduce in-rush current.

In one embodiment, the FPGA manages resets.

Thus, some features consistent with the present invention have been outlined in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

The FIGURE shows a block diagram of the layout of a multipurpose microprocessor card (MPC) for use as a central processing unit (CPU) for Command and Data Handling of spacecraft (C&DH), instrument, and payload, as well as Coronagraph instrument (CFI), in space telescope applications, according to one embodiment consistent with the present invention.

DESCRIPTION OF THE INVENTION

The present invention is a multipurpose microprocessor card designed to be used as the central processing unit for the Command and Data Handling of spacecraft (C&DH), instrument and payload (IC&DH), as well as any custom instrument controller. The processor card of the present invention also utilizes a state-of-the-art, radiation hardened processor (e.g., Aeroflex Gaisler GR70 Quad-Core LEON4

SPARC V8 250 Mhz processor) and supports SpaceWire, technical standard balanced voltage digital interface circuit (e.g., RS-422), and MIL-1553B protocols to communicate with other critical cards and instruments throughout the spacecraft bus. The design of the present invention takes advantage of the fast communication between the processor and a space-qualified radiation-hardened field-programmable gate array (FPGA), to involve high-speed peripherals controlled by the FPGA and accessible by the processor. The present invention has a dedicated port to provide its analogue telemetry to be monitored by other cards and is capable of generating a power cycle by a communication board or any other entity capable of monitoring same.

In one embodiment, the novel layout of the MPC 100 (see the FIGURE) of the present invention utilizes both a state-of-the-art processor 101 (e.g., Aeroflex Gaisler GR70) as the main CPU on the card 100, and a field-programmable-gate-array (FPGA) 102 (e.g., Microchip RTG4 FGPA), which has high-performance interfaces on a single chip.

In one embodiment, the processor 101 is connected to the FPGA 102 through peripheral component interconnect (PCI) interface 103, which connects PCI core 104 and PCI core 105, on the processor 101 and FPGA 102, respectively.

In one embodiment, the main processor 101 is a radiation-hard system-on-chip featuring a quad-core fault-tolerant processor 101 (e.g., Aeroflex Gaisler GR70 LEON4 SPARC V8 250 Mhz processor), and supports a multi-port (e.g., eight-port) Space Wire router 106, and a plurality of Space Wires 107 (e.g., eight Space Wires 107 (SPW 1-8)). In one embodiment, the processor 101 system frequency is 250 MHz. In one embodiment, the processor 101 provides the majority of the processor board's 100 software processing power.

In one embodiment, the processor 101 is packaged in a 625-pin Land Grid Array (LGA) pack.

In one embodiment, the processor 101 controls the main data bus 108 (e.g., MIL-1553B data bus 108) interconnect (by default). In one embodiment, the MIL-STD-1553 108 connectors are J21 (Channel A) and J22 (Channel B) for the processor 101. In one embodiment, the printed circuit board (PCB) 100 footprint supports a Twin-axial/Tri-axial connector (TRT) on the rear side of the board 100. Alternatively, in one embodiment, the connector through holes (not shown) may be used to pigtail to a bulkhead connector on either side of the board 100. In one embodiment, the PCB 100 footprints indicate the center contact with a square pattern.

In one embodiment, the processor 101 supports a start-up non-volatile, read-only memory (SUROM) 109 (e.g., an 8-bit wide, 64K SUROM or 64K magneto-resistive random-access-memory (MRAM), which is a type of electrically erasable programmable read-only memory (EEPROM) that is programmed and erased electrically and used to store the start-up code for a device). In one embodiment, the SUROM 109 is controlled by a programmable read-only memory (PROM) controller 110.

In one embodiment, the processor 101 supports a Synchronous Dynamic Random Access Memory (SDRAM) 111 (e.g. a 256 MB memory (+128 MB forward error correction (FEC))), controlled by an SDRAM controller 112. In one embodiment, the SDRAM 111 is on the processor 101 memory bus and is intended to be the running space of the main application code.

In one embodiment, the processor 101 also features two universal asynchronous receiver/transmitters (UARTs) 113, 114, connected to the main processor 101 at UART 115, and one UART 116 connected to the FPGA 102 at UART 117. In one embodiment, the UART debug ports 113, 114, 116 allow communication between the target device and the host for debugging purposes. In one embodiment, each UART 113, 114, 116 requires two unidirectional pins, one for transmitting data from the target to the host, and one for receiving data.

In embodiment, the MPC 100 has two debug ports: 1) a Space Wire debug port 118 connected to the processor 101 at SpaceWire Debug 119; and 2) the joint test action group (JTAG) Debug port 120 connected to the FPGA 102 at JTAG Debug 121, which provide ports for testing, debugging and programming.

In one embodiment, the processor 101 JTAG port is accessed via header J34 (not shown) and the FPGA 102 JTAG port 120 is accessed via header J35. In one embodiment, the PCB 100 footprint for J34 is a 2×5 header with 0.1" pitch through holes and all signals are buffered, and the PCB 100 footprint for J35 is a 9-pin standard micro-D connector.

In one embodiment, the radiation tolerant field-programmable-gate-array (FPGA) 102 (e.g., Microchip RTG4 FGPA) disposed on the MPC 100, has high-performance interfaces, while maintaining the resistance to radiation-induced configuration upsets in the harshest radiation environments, such as space flight. In one embodiment, the FPGA 102 is packaged in a 1657-pin ceramic column grid array. The FPGA 102 of the present invention can be used for numerous internal functions depending on the application.

In one embodiment, the FPGA 102 includes highly reliable, nonvolatile re-programmable flash technology, and single-event upset (SEU) hardened registers which eliminate the need for triple-module redundance (TMR) and configuration memory upsets immunity.

In one embodiment, the FPGA 102 includes a magneto-resistive random-access memory (MRAM) 122, which includes a plurality of non-volatile random-access memories (NVRAM) 123 (e.g., 2×16 MB NVRAMs 123, denoted NVRAM1 123A, and NVRAM2 123B) which serve as a primary program code storage. In one embodiment, the MRAM 122 is on the main memory bus and is intended to hold the application code for the board 100. In one embodiment, the MRAM 122 area is accessed by the processor 101 through the FPGA 102. In one embodiment, the FPGA 102 is under complete control of this interface. In one embodiment, the processor 101 may access the memory 122 through the FPGA 102.

In one embodiment, the FPGA 102 also includes a plurality of synchronous dynamic random-access memory (SDRAM) 124 (e.g., six (6) high-speed one (1) Gbit double data rate 2 (DDR2) SDRAM 124), and SDRAM modules/banks 125. In one embodiment, the FPGA 102 SDRAM 124 is organized with six banks 125 of 512 Mbit. In one embodiment, each bank 125 has a 16-bit interface and is selected with specific CS (chip select signal), UDQM (upper data mask) and LDQM (lower data mask) (which control the upper and lower bytes of the I/O buffers). In one embodiment, the SDRAM 125 is packaged in a 114-pin Quad flat pack.

In one embodiment, the FPGA 102 implements the control of the DDR2 125 memory devices as well as the electrical interface to them.

In one embodiment, the FPGA 102 supports a multi-port Space Wire router 126, for a plurality of Space Wires 127 (e.g., 12 Space Wires 127 (SPW 9-20)). In one embodiment, the board 100 features six low voltage differential signaling (LVDS) repeaters 138 that are configured primarily for SpaceWire, with each repeater supporting two SpaceWire ports. Therefore, the LVDS repeaters support twelve Space-Wire ports 127 (SPW 9-20). When added to the number of Space Wires 107 supported by the processor 101, this provides a novel total 20 ports for Space Wires.

In one embodiment, the FPGA 102 includes a technical standard balanced voltage digital interface circuit 128 (e.g., an RS-422 128), with up to 16 transmitter (TX) 128A and 16 receiver (RX) 128B, and/or low-voltage differential signaling (LVDS) Discrete Differential input/output (I.O), and/or UARTs 113, 114, 117. Thus, there are up to 32 pairs of differential I/O signals (LVDS or RS-422) available for use by the FPGA 102.

In one embodiment, all RS422 128 differential I/O are split between one 69-pin MDM pin (J33) and one 26-pin HDD (high density d-sub connector) (J39).

In one embodiment, the FPGA 102 has housekeeping outputs for temperatures and voltages 129, and an ID configuration and debug port 130. The processor 101 also has outputs for temperatures and voltages 131.

In one embodiment, the housekeeping or analog test port 138 is designated as J29. In one embodiment, the PCB 100 footprint is arranged in the formation of a 15-pin, standard density D-type connector with 0.042" through holes (not shown).

In one embodiment, the board 100 requires 3.3V power (see power connector 132, arranged as a 26-pin, HDD (high density d-sub connector)) to operate and can be as high as 19.5 W when fully populated and operating. In one embodiment, the board 100 features three synchronous buck regulators to generate the secondary supply voltages: 1.2V for the FPGA 102 and processor 101 core supply (see voltages 131), 1.8V for the FPGA 102 and DDR2 125 core supply (see voltages 131 and 129), and 2.5V for the on-board LVDS supply (see voltages 131, 129).

In one embodiment, an output termination voltage regulator (VTT REG) 133 is a DDR 125 termination voltage regulator to regulate power through the DDR 125 transmission lines and achieve power conservation by rapidly dropping or increasing current so that the output termination voltage (VTT) would be half of the supply voltage (VDDQ). This results in reduced power dissipation and higher efficiency for the board 100 of the present invention.

In one embodiment, a radiation tolerant oscillator 134 (e.g., a Q-Tech QT194 crystal oscillator (50 MHz) 1340 with Microchip EX-219 oscillator 134B) is provided on the MPC 100. In one embodiment, the board 100 is designed to operate based off a single, on-board 50 MHz oscillator 134A. In the present invention, the oscillator 134 sources the processor 101 and FPGA 102. In one embodiment, the FPGA 102 is responsible for generating the MIL-STD-1553 bus 108, PCI 104 and external memory clock 134A for the processor 101. In one embodiment, the SpaceWire clocks 134A, 134B are generated by the processor 101 and FPGA 102, separately and internally.

In one embodiment, the MPC 100 is 9.9×9.5 inches, and has a mass of 3.5 kg.

In one embodiment, in operation, the MPC 100 has automatic power-up sequencing system to reduce in-rush current and meet the processor 101 requirements. In one embodiment, the Startup ROM (SUROM) memory 109, 109A interfaces directly to the processor 101 PROM controller 110 and contains the first software instructions that the processor 100 executes upon power-on or reset. In one embodiment, the initial loading of the SUROM 109 is performed through the processor 101 Debug Support Unit, either via JTAG 121/120, or via the SpaceWire Debug port 118/119.

In one embodiment, used in applications such as space applications, the SUROM 109 software is responsible for initializing and loading the flight computer and performing any desired built-in tests. In one embodiment, the flight software program code is stored in two separate groupings of the NVRAM 123 storage which are only accessible from the processor 101, referred to as NVMRAM1 123A and NVMRAM2 123B. Because the NVRAM 123 is not directly accessible, the SUROM 109 software must configure the PCI bus 103 to access the NVRAM 123 through the main processor 101.

In one embodiment, the MPC 100 allows five sources for board-level reset: 1) power-on, 2) external discrete, 3) watchdog, 4) phase-locked loop (PLL) Loss of Lock, and 5) command generated reset. In one embodiment, the FPGA 102 will be responsible for managing resets (see Reset 137 on FPGA 102) for all of the other components on the MPC 100 (see Reset 136 on the processor 101).

In one embodiment, there are 34 connectors and headers on the processor card 100, with 27 connectors on side panels.

The present invention has applications in any space mission instruments or telescope applications. The present invention's processor board's speed and performance, such as its capability of high-speed processing, meets the requirements of both command and data handling (C&DH) and iC&DH of high-class missions and can be customized for any type of instrument. The FPGA of the present invention can program custom code based on the mission's needs, such as adding another soft-core processor or high-speed parallel processing. Thus, the present invention is a novel improvement over existing processors and FPGAs, particularly for use in space telescope applications.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A processor board comprising:
a processor; and
a field-programmable gate array (FPGA);
wherein the processor is connected to the FPGA through a peripheral component interconnect (PCI) interface, which connects a first PCI core on the processor to a second PCI core on the FPGA;
wherein the processor is a radiation-hard system-on-chip featuring a quad-core fault-tolerant processor, and which supports a first multi-port SpaceWire router and a plurality of first SpaceWires;
wherein the FPGA has a radiation-hard configuration and includes nonvolatile re-programmable flash technology, and single-event upset (SEU) hardened registers; and
wherein the FPGA supports a second multi-port Space-Wire router and a plurality of second SpaceWires that exceeds a number of the plurality of the first Space-Wires.

2. The processor board of claim 1, further comprising:
a plurality of low voltage differential signaling (LVDS) repeaters configured for the plurality of second Space-Wires, with each of the plurality of LVDS repeaters supporting two Space Wire ports.

3. The processor board of claim 2, wherein the second multi-port SpaceWire router and the plurality of LVDS repeaters support twelve SpaceWire ports, and the first multi-port SpaceWire router supports eight SpaceWire ports, totaling 20 ports supported by the first multi-port SpaceWire router and the second multi-port SpaceWire router.

4. The processor board of claim 3, wherein the processor supports a start-up non-volatile, read-only memory (SUROM) controlled by a programmable read-only memory (PROM) controller.

5. The processor board of claim 4, wherein the processor supports a Synchronous Dynamic Random Access Memory (SDRAM), controlled by an SDRAM controller.

6. The processor board of claim 5, wherein the processor further comprises:
a plurality of first universal asynchronous receiver/transmitters (UARTs) connected to the processor at a first UART position thereon; and
a plurality of second UARTs connected to the processor at a second UART position thereon.

7. The processor of claim 6, further comprising:
a plurality of debug ports which allow communication between a target device and a host for debugging purposes.

8. The processor board of claim 7, further comprising:
a SpaceWire debug port connected to the processor; and
a joint test action group (JTAG) debug port connected to the FPGA;
wherein initial loading of the SUROM is performed through one of the SpaceWire debug port or the JTAG debug port.

9. The processor board of claim 8, wherein the FPGA further comprises:
a magneto-resistive random-access memory (MRAM), which includes a plurality of non-volatile random-access memories (NVRAM) which serve as a primary program code storage;
wherein the MRAM is accessed by the processor through the FPGA.

10. The processor board of claim 9, wherein the FPGA further comprises:
a synchronous dynamic random-access memory (SDRAM);
wherein the SDRAM includes a plurality of double data rate 2 (DDR2) SDRAM banks each of which has a 16-bit interface and is selected with a predetermined chip select signal, an upper data mask (UDQM) and a lower data mask (LDQM).

11. The processor board of claim 10, wherein the FPGA controls the plurality of DDR2 SDRAM banks and an electrical interface to the plurality of DDR2 SDRAM banks.

12. The processor board of claim 11, wherein the FPGA further comprises:
a technical standard balanced voltage digital interface circuit with up to 16 transmitters (TX) and up to 16 receivers (RX), and/or a plurality of low-voltage differential signaling (LVDS) Discrete Differential inputs/outputs (I.O) for use by the FPGA.

13. The processor board of claim 1, wherein the processor board includes a 3.3V supply voltage.

14. The processor board of claim 13, further comprising:
a plurality of synchronous buck regulators to generate secondary supply voltages for the FPGA and the processor.

15. The processor board of claim 14, further comprising:
an output termination voltage regulator to regulate power through a plurality of DDR2 SDRAM transmission lines and achieve power conservation by increasing/ decreasing current so that an output termination voltage is half of the supply voltage.

16. The processor board of claim 1, further comprising:
a radiation tolerant oscillator which operates based off a single, on-board 50 MHz oscillator;
wherein the oscillator sources the processor and the FPGA; and
wherein SpaceWire clocks are generated by the processor and the FPGA, separately and internally.

17. The processor board of claim 16, wherein the FPGA is responsible for generating the data bus, the PCI interface, and an external memory clock for the processor.

18. The processor board of claim 17, wherein power-up sequencing after power-on is automatic to reduce in-rush current.

19. The processor board of claim 18, wherein the FPGA manages resets.

\*   \*   \*   \*   \*